(12) United States Patent
Kuo

(10) Patent No.: US 7,620,804 B2
(45) Date of Patent: Nov. 17, 2009

(54) CENTRAL PROCESSING UNIT ARCHITECTURE WITH MULTIPLE PIPELINES WHICH DECODES BUT DOES NOT EXECUTE BOTH BRANCH PATHS

(75) Inventor: Chien-Cheng Kuo, Taipei (TW)

(73) Assignee: NVIDIA Corporation, Santa Clara, CA (US)

( * ) Notice: Subject to any disclaimer, the term of this patent is extended or adjusted under 35 U.S.C. 154(b) by 13 days.

(21) Appl. No.: 11/200,020

(22) Filed: Aug. 10, 2005

(65) Prior Publication Data

US 2007/0016760 A1 Jan. 18, 2007

(30) Foreign Application Priority Data

Jul. 15, 2005 (TW) ............................... 94123990 A

(51) Int. Cl.
*G06F 9/32* (2006.01)
(52) U.S. Cl. .................... 712/235; 712/234; 712/237
(58) Field of Classification Search ................ 712/235, 712/234, 237
See application file for complete search history.

(56) References Cited

U.S. PATENT DOCUMENTS

| | | | | | |
|---|---|---|---|---|---|
| 4,439,827 | A | * | 3/1984 | Wilkes ........................ | 712/235 |
| 5,165,025 | A | * | 11/1992 | Lass ........................... | 712/235 |
| 5,696,958 | A | * | 12/1997 | Mowry et al. ............... | 712/235 |
| 5,850,542 | A | * | 12/1998 | Schroter et al. ............. | 712/235 |
| 6,065,115 | A | * | 5/2000 | Sharangpani et al. ....... | 712/235 |
| 6,269,439 | B1 | * | 7/2001 | Hanaki ....................... | 712/235 |
| 2003/0023838 | A1 | * | 1/2003 | Karim et al. ................ | 712/235 |
| 2004/0111592 | A1 | * | 6/2004 | Nagao et al. ................ | 712/235 |

* cited by examiner

*Primary Examiner*—Eddie P Chan
*Assistant Examiner*—Keith Vicary
(74) *Attorney, Agent, or Firm*—Patterson & Sheridan, LLP

(57) ABSTRACT

A central processing unit (CPU) architecture with enhanced branch execution, being substantially a pipelined CPU with multiple pipelines, each pipeline having a plurality of stages, by which all instructions relating directly to a branch instruction of a code executed by the pipelined CPU are being fetched respectively by each corresponding pipeline for enabling the code to be executed without stall so that the number of cycles required to execute the code can be reduced effectively. Moreover, the multiple pipelines can save more cycles when the number of stages in one pipeline is large.

14 Claims, 5 Drawing Sheets

| | Fetch A | Decode A | Execute | Writeback |
|---|---|---|---|---|
| | Fetch B | Decode B | | |
| Cycle 0 | CMP R1, R2 | | | |
| | No operation | | | |
| Cycle 1 | JB process_A | CMP R1, R2 | | |
| | No operation | No operation | | |
| Cycle 2 | MOV R3, R1 | JB process_A | CMP R1, R2 | |
| | No operation | No operation | | |
| Cycle 3 | : | MOV R3, R1 | JB process_A | CMP R1, R2 |
| | MOV R3, R2 | No operation | | |
| Cycle 4 | : | : | MOV R3, R1 | JB process_A |
| | : | MOV R3, R2 | | |
| Cycle 5 | : | : | No operation | MOV R3, R1 |
| | : | : | | |

|  | Fetch | Decode | Execute | Writeback |
|---|---|---|---|---|
| Cycle 0 | CMP R1, R2 | | | |
| Cycle 1 | JB process_A | CMP R1, R2 | | |
| Cycle 2 | MOV R3, R1 | JB process_A | CMP R1, R2 | |
| Cycle 3 | : | MOV R3, R1 | JB process_A | CMP R1, R2 |
| Cycle 4 | : | : | MOV R3, R1 | JB process_A |
| Cycle 5 | : | : | : | MOV R3, R1 |

FIG. 2

|  | Fetch | Decode | Execute | Writeback |
|---|---|---|---|---|
| Cycle 0 | CMP R1, R2 | | | |
| Cycle 1 | JB process_A | CMP R1, R2 | | |
| Cycle 2 | MOV R3, R1 | JB process_A | CMP R1, R2 | |
| Cycle 3 | : | MOV R3, R1 | JB process_A | CMP R1, R2 |
| Cycle 4 | MOV R3, R2 | No operation | No operation | JB process_A |
| Cycle 5 | : | MOV R3, R2 | No operation | No operation |
| Cycle 6 | : | : | MOV R3, R2 | No operation |
| Cycle 7 | : | : | : | MOV R3, R2 |

FIG. 3

|  | Fetch A<br>Fetch B | Decode A<br>Decode B | Execute | Writeback |
|---|---|---|---|---|
| Cycle 0 | CMP R1, R2<br>No operation | | | |
| Cycle 1 | JB process_A<br>No operation | CMP R1, R2<br>No operation | | |
| Cycle 2 | MOV R3, R1<br>No operation | JB process_A<br>No operation | CMP R1, R2 | |
| Cycle 3 | ...<br>MOV R3, R2 | MOV R3, R1<br>No operation | JB process_A | CMP R1, R2 |
| Cycle 4 | ...<br>... | ...<br>MOV R3, R2 | MOV R3, R1 | JB process_A |
| Cycle 5 | | ...<br>... | No operation | MOV R3, R1 |

FIG. 4

|  | Fetch A<br>Fetch B | Decode A<br>Decode B | Execute | Writeback |
|---|---|---|---|---|
| Cycle 0 | CMP R1, R2<br>No operation | | | |
| Cycle 1 | JB process_A<br>No operation | CMP R1, R2<br>No operation | | |
| Cycle 2 | MOV R3, R1<br>No operation | JB process_A<br>No operation | CMP R1, R2 | |
| Cycle 3 | MOV R3, R2 | MOV R3, R1<br>No operation | JB process_A | CMP R1, R2 |
| Cycle 4 | ... | MOV R3, R2 | No operation | JB process_A |
| Cycle 5 | ... | ... | MOV R3, R2 | No operation |
| Cycle 6 | ... | ... | ... | MOV R3, R2 |

FIG. 5

CENTRAL PROCESSING UNIT ARCHITECTURE WITH MULTIPLE PIPELINES WHICH DECODES BUT DOES NOT EXECUTE BOTH BRANCH PATHS

FIELD OF THE INVENTION

The present invention relates to a central processing unit (CPU) architecture with enhanced branch execution, being substantially a pipelined CPU with multiple pipelines, each pipeline having a plurality of stages, by which all instructions relating directly to a branch instruction of a code executed by the pipelined CPU are being fetched respectively by each corresponding pipeline for enabling the code to be executed without stall so that the number of cycles required to execute the code can be reduced effectively. Moreover, the multiple pipelines can save more cycles when the number of stages in one pipeline is large.

BACKGROUND OF THE INVENTION

Pipelining is a computer architecture implementation technique in which the execution of adjacent machine instructions is overlapped in time. Pipelining has been and continues to be the main technique for creating fast central processing units (CPUs), since it requires no change to compilers, linkers or programming techniques and yield is a tremendous performance improvement.

A pipelined CPU divides the execution of machine instructions into small, discrete steps or stages, whereas each stage can use only one cycle to execute. Each stage performs a fixed task or set of tasks on the machine instructions. Each stage expects that the tasks done by the preceding stage have been correctly and completely performed. The time required to do the tasks at each stage is less than the time it would take to completely execute the machine instruction. Therefore, it is noted that more stages will get better timing and get higher speed CPU.

In order to make pipelining work efficiently, it is necessary to keep all the stages full. However, there is a branch prediction problem whenever an instruction is encountered that alters the sequential flow of control in the program. If statements, loop statements, and procedure statements, which are BRANCH or JUMP instructions that requires one or more results being computed by the preceding instruction(s), cause problems with the pipeline. Consider the following code:

IF (condition A)
    Execute procedure B
    ELSE
    Execute procedure C

It is note that a pipelined CPU must execute procedure B or C based on the result of condition A. But the pipelined CPU can't wait the result of condition A and then get the procedure B or C instructions into pipelined stage. Thus, the pipelined CPU must "prediction" the result of condition A and read one of the procedure B or C instructions into pipeline, otherwise many stages in the pipeline will be idle as the CPU waits the result of condition A. If the CPU predicts condition A is true and reads procedure B instructions into pipeline while condition A is really true, then the CPU "hits" the result and finishes the above IF-ELSE procedure quickly. But if the CPU predicts condition A is true and reads procedure B instructions into pipeline while condition A is false, then the CPU "misses" the result and it must stop the execution of procedure B in the pipeline and get the procedure C instructions into pipeline to be executed, which will waste a lot of time. By virtue of this, although pipelining is the technique for creating fast CPU, it does not get equivalent performance.

Therefore, there is a need for an improvement for branch execution in pipelined CPU by multiple pipelines.

SUMMARY OF THE INVENTION

It is the primary object of the present invention to provide a central processing unit (CPU) architecture with enhanced branch execution, being substantially a pipelined CPU with multiple pipelines, each pipeline having a plurality of stages, by which all instructions relating directly to a branch instruction of a code executed by the pipelined CPU are being fetched respectively by each corresponding pipeline for enabling the code to be executed without stall so that the number of cycles required to execute the code can be reduced effectively. Moreover, the multiple pipelines can save more cycles when the number of stages in one pipeline is large.

Another object of the invention is to provide a CPU architecture with at least two pipelines, the CPU architecture having at least a stage shared by the plural pipelines, such that the CPU architecture can be cheaper and less complicated.

Other aspects and advantages of the present invention will become apparent from the following detailed description, taken in conjunction with the accompanying drawings, illustrating by way of example the principles of the present invention.

BRIEF DESCRIPTION OF THE DRAWINGS

FIG. 2 is a chart depicting a specific code being executed by a pipelined CPU with single pipeline as the branch execution hits.

FIG. 3 is a chart depicting a code being executed by a pipelined CPU with single pipeline as the branch execution misses.

FIG. 4 is a chart depicting a code being executed by the pipelined CPU with two pipelines of FIG. 1 as the branch execution hits.

FIG. 5 is a chart depicting a code being executed by the pipelined CPU with two pipelines of FIG. 1 as the branch execution misses.

DESCRIPTION OF THE PREFERRED EMBODIMENT

Figure 1:
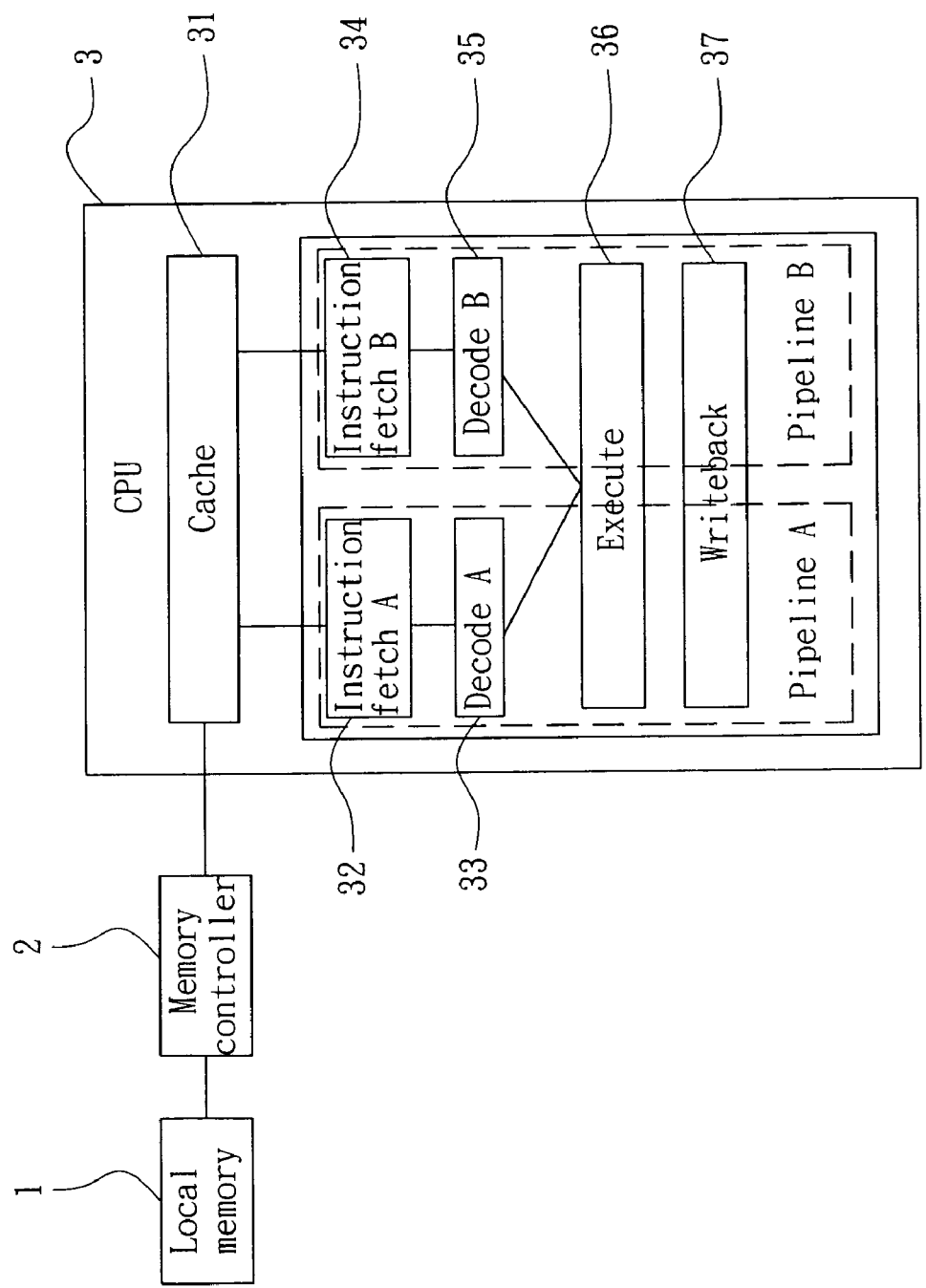
FIG. 1 is a function block diagram of a pipelined CPU with multiple pipelines according to a preferred embodiment of the present invention.

For your esteemed members of reviewing committee to further understand and recognize the fulfilled functions and structural characteristics of the invention, several preferable embodiments cooperating with detailed description are presented as the follows.

Please refer to FIG. 1, which is a function block diagram of a pipelined CPU with multiple pipelines according to a preferred embodiment of the present invention. As seen in FIG. 1, the system of the pipelines CPU with multiple pipelines of FIG. 1 comprises a local memory 1, a memory controller 2 and a CPU 3. The CPU 3 further comprises a cache 31 and two pipelines, i.e. pipeline A and B, wherein pipeline A has four stages, i.e. fetch A stage 32, decode A stage 33, execute stage 36, and writeback stage 37, and pipeline B has four stages, i.e. fetch B stage 34, decode B stage 35, execute stage 36, and writeback stage 37, whereas the execute stage 36 and the writeback stage 37 are shared by the two pipelines. It is noted that there can be more pipelines, each having more stages, being designed in the pipelined CPU of the present invention.

Please refer to FIG. 2, which is a chart depicting a specific code being executed by a pipelined CPU with single pipeline as the branch execution hits. Assuming the specific code being execute by the pipelined CPU with single pipeline is as following:

| | |
|---|---|
| CMP R1, R2 | ; compare R1 value with R2 value |
| JB process A | ; if R1 is larger than R2, than jump to process A |
| MOV R3, R2 | ; else move R2 value to R3 |
| process A; | |
| MOV R3, R1 | ; move R1 value to R3 |

As seen in FIG. 2, there are four stages in the single pipeline. The first stage is the "FETCH" stage, which reads the instruction to be executed from memory. The second stage is the "DECODE" stage. This stage identifies the instruction to be executed and fetches any register-resident operands. The third stage is the "EXECUTE" stage. This stage performs an arithmetic or logical operation on the register-based operands. The fourth and final stage is the "WRITEBACK" stage. This stage writes the result of the execute stage into a register. Note that once the fetch stage is completed for the i-th instruction, the fetch stage may be started for the i+1st instruction. Likewise, the decode, execute and writeback stages be performed for the i+1st instruction immediately after completing work on the i-th instruction.

FIG. 2 shows what happens if a pipelined CPU with single pipeline is being used to execute the above code and the next instruction fetched after branch execution is "MOV R3, R1" while R1 is really larger than R2. In the Cycle 0, the instruction "CMP R1, R2" is fetched. In the Cycle 1 following the Cycle 0, the instruction "JB process A" is fetched while the instruction "CMP R1, R2" is decoded. In the Cycle 2 following the Cycle 1, the instruction "MOV R3, R1" is fetched since R1 is really larger than R2 enabling the process to jump to execute the process A, and the instruction "JB process A" is decoded while the instruction "CMP R1, R2" is being executed. In the Cycle 3 following the Cycle 2, the instruction "MOV R3, R1" is decoded, and the instruction "JB process A" is being executed while the result of the executed instruction "CMP R1, R2" is being written into a register. In the Cycle 4 following the Cycle 3, the instruction "MOV R3, R1" is being executed while the result of the executed instruction "JB process A" is being written into a register. In the Cycle 5 following the Cycle 4, the result of the executed instruction "MOV R3, R1" is being written into a register. Noted that the pipelined CPU with signal pipeline would take only 6 cycles, i.e. Cycle 0~Cycle 5, to complete the above code when the branch execution "hits".

Please refer to FIG. 3, which is a chart depicting a specific code being executed by a pipelined CPU with single pipeline as the branch execution misses. Assuming the specific being executed by the pipelined CPU with single pipeline is the same as that of FIG. 2 and the only difference is that the R1 is not larger than R2, i.e. the branch execution "misses".

Similarly, FIG. 3 shows what happens if a pipelined CPU with single pipeline is being used to execute the above code and the next instruction fetched after branch execution is "MOV R3, R1" while R1 is not larger than R2. In the Cycle 0, the instruction "CMP R1, R2" is fetched. In the Cycle 1 following the Cycle 0, the instruction "JB process A" is fetched while the instruction "CMP R1, R2" is decoded. In the Cycle 2 following the Cycle 1, the instruction "MOV R3, R1" is fetched, and the instruction "JB process A" is decoded while the instruction "CMP R1, R2" is being executed. In the Cycle 3 following the Cycle 2, the instruction "MOV R3, R2" is decoded, and the instruction "JB process A" is being executed while the result of the executed instruction "CMP R1, R2" is being written into a register. In the Cycle 4 following the Cycle 3, the instruction "MOV R3, R1" can not be executed since R1 is not larger than R2 and thus another instruction "MOV R3, R2" is fetched, while the result of the executed instruction "JB process A" is being written into a register. In the Cycle 5 following the Cycle 4, the instruction "MOV R3, R2" is decoded. In the Cycle 6 following the Cycle 5, the instruction "MOV R3, R2" is being executed. In the Cycle 7 following the Cycle 6, the result of the executed instruction "MOV R3, R2" is being written into a register. Noted that the pipelined CPU with signal pipeline would take 8 cycles, i.e. Cycle 0~Cycle 7, to complete the above code when the branch execution "misses". The stall of performance is caused by the miss of branch execution that direct the CPU to execute the "JB process A" and thus fetch the wrong instruction "MOV R3, R1" in the Cycle 2 instead of executing the correct instruction "MOV R3, R2". Since the CPU must discard the wrongfully fetched instruction "MOV R3, R1" and fetch again the correct instruction "MOV R3, R2", two cycles are wasted.

Please refer to FIG. 4, which is a chart depicting a code being executed by the pipelined CPU with two pipelines of FIG. 1 as the branch execution hits. The pipelined CPU with two pipelines of FIG. 1 are being used for executing the specific code the same as that of FIG. 2. The pipelined CPU has two pipelines, i.e. pipeline A and B, and the pipeline A has four stages, i.e. fetch A stage 32, decode A stage 33, execute stage 36, and writeback stage 37, and the pipeline B has four stages, i.e. fetch B stage 34, decode B stage 35, execute stage 36, and writeback stage 37, whereas the execute stage 36 and the writeback stage 37 are shared by the two pipelines.

FIG. 4 shows what happens if a pipelined CPU with two pipelines is being used to execute the above code and the next instruction fetched after branch execution is "MOV R3, R1" while R1 is really larger than R2. Assuming that the default pipeline of the CPU is the pipeline A. In the Cycle 0, the instruction "CMP R1, R2" is fetched by the default pipeline A. In the Cycle 1 following the Cycle 0, the instruction "JB process A" is fetched by the default pipeline A while the instruction "CMP R1, R2" is decoded. In the Cycle 2 following the Cycle 1, the instruction "MOV R3, R1" is fetched by the default pipeline A and the instruction "JB process A" is decoded while the instruction "CMP R1, R2" is being executed, and the same time the pipelined CPU detects the existence of the pipeline B. In the Cycle 3 following the Cycle 2, the instruction "MOV R3, R2" is fetched by the pipeline B, the instruction "MOV R3, R1" is decoded, and the instruction "JB process A" is being executed while the result of the executed instruction "CMP R1, R2" is being written into a register In the Cycle 4 following the Cycle 3, the instruction "MOV R3, R1" is being executed while the result of the executed instruction "JB process A" is being written into a register for enabling the pipelined CPU to detect that R1 is really larger than R2, i.e. the branch execution hits, and then to discard the instructions in the pipeline B. In the Cycle 5 following the Cycle 4, the result of the executed instruction "MOV R3, R1" is being written into a register. Noted that the pipelined CPU with two pipelines would take only 6 cycles, i.e. Cycle 0~Cycle 5, to complete the above code when the branch execution "hits", which is the same as that of the pipelined CPU with single pipeline.

Please refer to FIG. 5, which is a chart depicting a code being executed by the pipelined CPU with two pipelines of FIG. 1 as the branch execution misses. Assuming the specific being executed by the pipelined CPU with two pipelines is the same as that of FIG. 4 and the only difference is that the R1 is not larger than R2, i.e. the branch execution "misses". Thus, in the Cycle 4, the CPU detect that R1 is not larger than R2 after the result of the executed instruction "JB process A" is being written into a register, i.e. the branch execution misses, for enabling the CPU to discard the instructions in the pipeline A. And thereafter, the instruction in the pipeline B is being executed instead. Noted that the pipelined CPU with two pipelines would take only 7 cycles, i.e. Cycle 0~Cycle 6, to complete the above code when the branch execution "misses", which is one cycle less than that of the pipelined CPU with single pipeline.

Moreover, by designing a pipelined CPU with multiple pipelines to have shared stages, the cost and the complexity of the pipelined CPU are reduced.

From the above description relating to FIG. 1 to FIG. 5, it is clear that the present invention provide a central processing unit (CPU) architecture with enhanced branch execution, being substantially a pipelined CPU with multiple pipelines, each pipeline having a plurality of stages, by which all instructions relating directly to a branch instruction of a code executed by the pipelined CPU are being fetched respectively by each corresponding pipeline for enabling the code to be executed without stall so that the number of cycles required to execute the code can be reduced effectively. Moreover, the multiple pipelines can save more cycles when the number of stages in one pipeline is large.

While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. A pipelined central processing unit (CPU) architecture, comprising:
   a local memory configured to store a sequence of instructions including a first instruction, immediately followed by a branch instruction, immediately followed by a second instruction, and a branch target instruction that is specified by the branch instruction; and
   a CPU coupled to the local memory and including a first pipeline with multiple pipeline stages and a second pipeline with multiple pipeline stages, the first pipeline configured to:
   fetch the first instruction, the branch instruction, and the branch target instruction,
   decode the first instruction, the branch instruction, and the branch target instruction,
   execute the first instruction and the branch instruction, wherein execution of the branch instruction produces a branch instruction result that is either a hit or a miss, and
   execute the branch target instruction only when the branch instruction result is a hit, and
   the second pipeline configured to:
   fetch the second instruction,
   decode the second instruction, and
   execute the second instruction only when the branch instruction result is a miss and discard the second instruction when the branch instruction result is a hit,
   wherein the second pipeline is further configured to decode the second instruction one clock cycle after the branch target instruction is decoded by the first pipeline and one clock cycle after the branch instruction is executed.

2. The CPU structure of claim 1, wherein the first pipeline includes a fetch stage, a decode stage, an execute stage and a writeback stage.

3. A method of processing a sequence of instructions, comprising the steps of:
   fetching a first instruction, a branch instruction, and branch target instruction by a first pipeline from a local memory configured to store a sequence of instructions including a first instruction, immediately followed by a branch instruction, immediately followed by a second instruction, and a branch target instruction that is specified by the branch instruction;
   decoding the first instruction, the branch instruction, and the branch target instruction by the first pipeline;
   executing the first instruction and the branch instruction in the first pipeline, wherein the first pipeline includes multiple pipeline stages and execution of the branch instruction produces a branch instruction result that is either a hit or a miss;
   executing the branch target instruction in the first pipeline only when the branch instruction result is a hit;
   fetching the second instruction by a second pipeline from the local memory;
   decoding the second instruction by the second pipeline; and
   executing the second instruction in the second pipeline having multiple pipeline stages only when the branch instruction result is a miss and discarding the second instruction when the branch instruction result is a hit,
   wherein the second pipeline is further configured to decode the second instruction one clock cycle after the branch target instruction is decoded by the first pipeline and one clock cycle after the branch instruction is executed.

4. The CPU structure of claim 2, wherein the second pipeline includes a second fetch stage and a second decode stage.

5. The CPU structure of claim 4, wherein the second pipeline shares the execute stage of the first pipeline.

6. The CPU structure of claim 4, wherein the second pipeline shares the writeback stage of the first pipeline.

7. The CPU structure of claim 2, wherein the decode stage is configured to decode the first instruction, the branch instruction, and the branch target instruction.

8. The CPU structure of claim 1, wherein the first pipeline is further configured to discard the branch target instruction when the branch instruction result is a miss.

9. The method of claim 3, wherein the first pipeline includes a fetch stage, a decode stage, an execute stage and a writeback stage.

10. The method of claim 9, wherein the second pipeline includes a second fetch stage and a second decode stage.

11. The method of claim 10, wherein the second pipeline shares the execute stage of the first pipeline.

12. The method of claim 10, wherein the second pipeline shares the writeback stage of the first pipeline.

13. The method of claim 9, wherein the decode stage is configured to decode the first instruction, the branch instruction, and the branch target instruction.

14. The method of claim 3, further comprising discarding the branch target instruction when the branch instruction result is a miss.

* * * * *